(12) United States Patent
Nakamura

(10) Patent No.: US 11,759,991 B2
(45) Date of Patent: Sep. 19, 2023

(54) PRODUCTION METHOD AND PRODUCTION APPARATUS FOR THERMOPLASTIC FILM

(71) Applicant: ZUIKO CORPORATION, Osaka (JP)

(72) Inventor: Hideyuki Nakamura, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 292 days.

(21) Appl. No.: 17/282,762

(22) PCT Filed: Oct. 28, 2019

(86) PCT No.: PCT/JP2019/042211
§ 371 (c)(1),
(2) Date: Apr. 4, 2021

(87) PCT Pub. No.: WO2020/090755
PCT Pub. Date: May 7, 2020

(65) Prior Publication Data
US 2022/0009144 A1    Jan. 13, 2022

(30) Foreign Application Priority Data
Oct. 29, 2018 (JP) .................................. 2018-202851

(51) Int. Cl.
| | |
|---|---|
| *B29C 48/88* | (2019.01) |
| *B29C 48/305* | (2019.01) |
| *B29C 48/08* | (2019.01) |
| *B29C 48/00* | (2019.01) |
| *B32B 5/02* | (2006.01) |

(Continued)

(52) U.S. Cl.
CPC ........ *B29C 48/914* (2019.02); *B29C 48/0021* (2019.02); *B29C 48/08* (2019.02); *B29C 48/305* (2019.02); *B32B 5/022* (2013.01); *B32B 27/02* (2013.01); *B32B 37/203* (2013.01);
(Continued)

(58) Field of Classification Search
None
See application file for complete search history.

(56) References Cited

U.S. PATENT DOCUMENTS

| | | | |
|---|---|---|---|
| 5,658,514 | A | 8/1997 | Fujii et al. |
| 2002/0027309 | A1 | 3/2002 | Fujii et al. |

FOREIGN PATENT DOCUMENTS

| | | |
|---|---|---|
| EP | 1016518 A1 | 7/2000 |
| JP | H09131790 A * | 8/1996 |

(Continued)

OTHER PUBLICATIONS

International Search Report for corresponding Application No. PCT/JP2019/042211, dated Dec. 17, 2019.
(Continued)

*Primary Examiner* — Barbara J Musser
(74) *Attorney, Agent, or Firm* — Renner, Otto, Boisselle & Sklar, LLP

(57) ABSTRACT

In a production apparatus, a pass line for conveying a film is formed in parts of both belts wound on common rolls and in contact with each other across the film, a discharge port of a discharger is so provided that the molten resin reaches one first roll, out of a group of first rolls, on a side upstream of the pass line, and the common rolls include a cooling roll for cooling and solidifying the molten resin discharged from the discharge port and having reached the first roll.

14 Claims, 10 Drawing Sheets

(51) Int. Cl.
| | |
|---|---|
| *B32B 27/12* | (2006.01) |
| *B32B 37/20* | (2006.01) |
| *B29K 101/12* | (2006.01) |
| *B29L 31/48* | (2006.01) |
| *B32B 27/02* | (2006.01) |

(52) U.S. Cl.
CPC ... *B29K 2101/12* (2013.01); *B29L 2031/4878* (2013.01); *B32B 2555/02* (2013.01)

(56) References Cited

FOREIGN PATENT DOCUMENTS

| | | | |
|---|---|---|---|
| JP | H08207137 A | * | 5/1997 |
| JP | H10-29259 A | | 2/1998 |
| JP | 2010-221562 A | | 10/2010 |
| WO | 9845116 A1 | | 10/1998 |

OTHER PUBLICATIONS

Office Action for corresponding CN Application No. 201980067297.4 dated Jun. 30, 2022, with English language translation.

\* cited by examiner

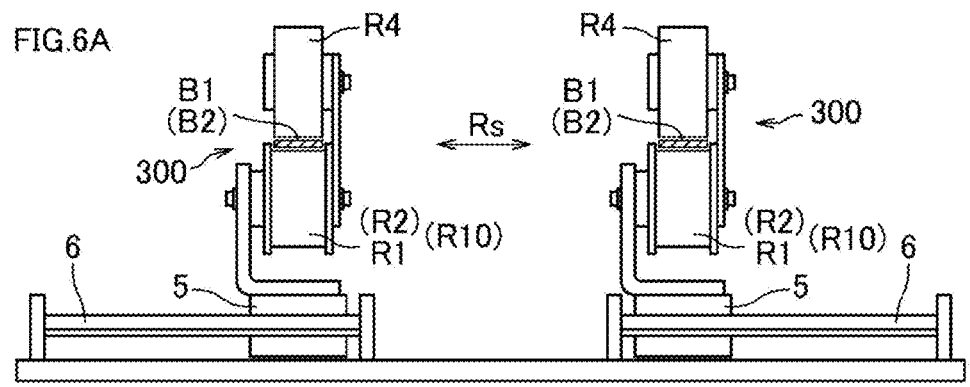
FIG.6A
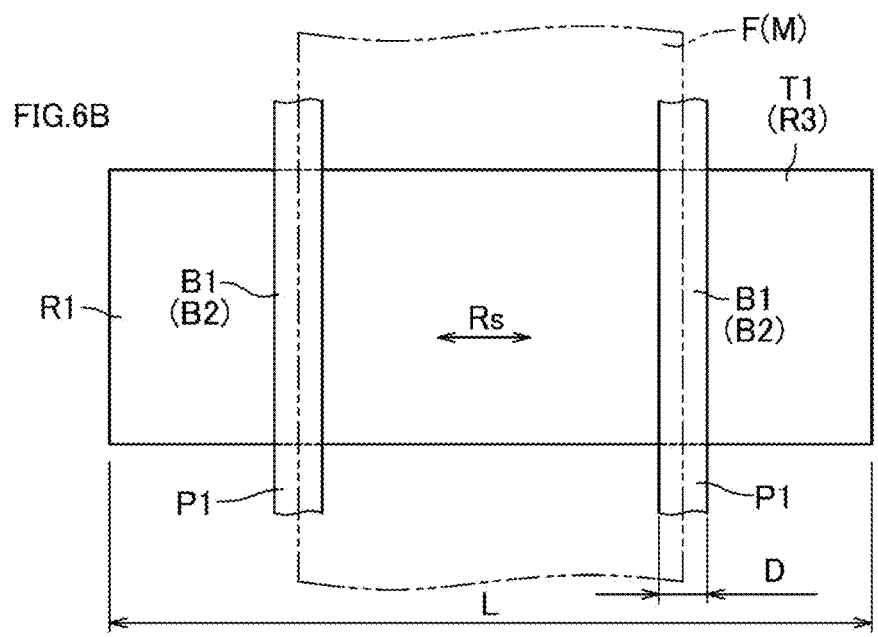
FIG.6B
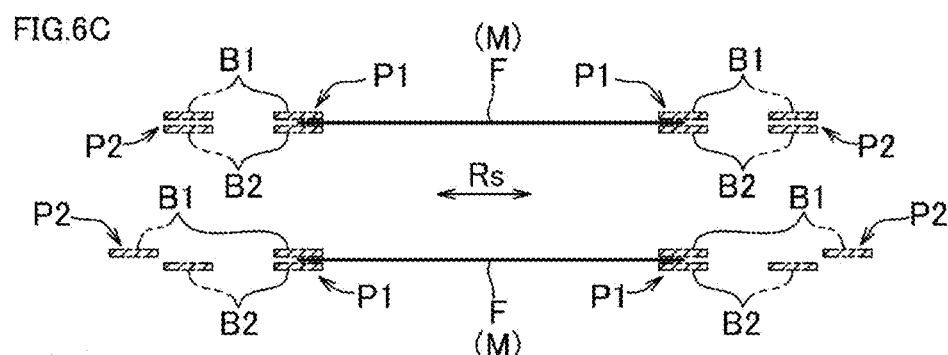
FIG.6C
FIG.6D

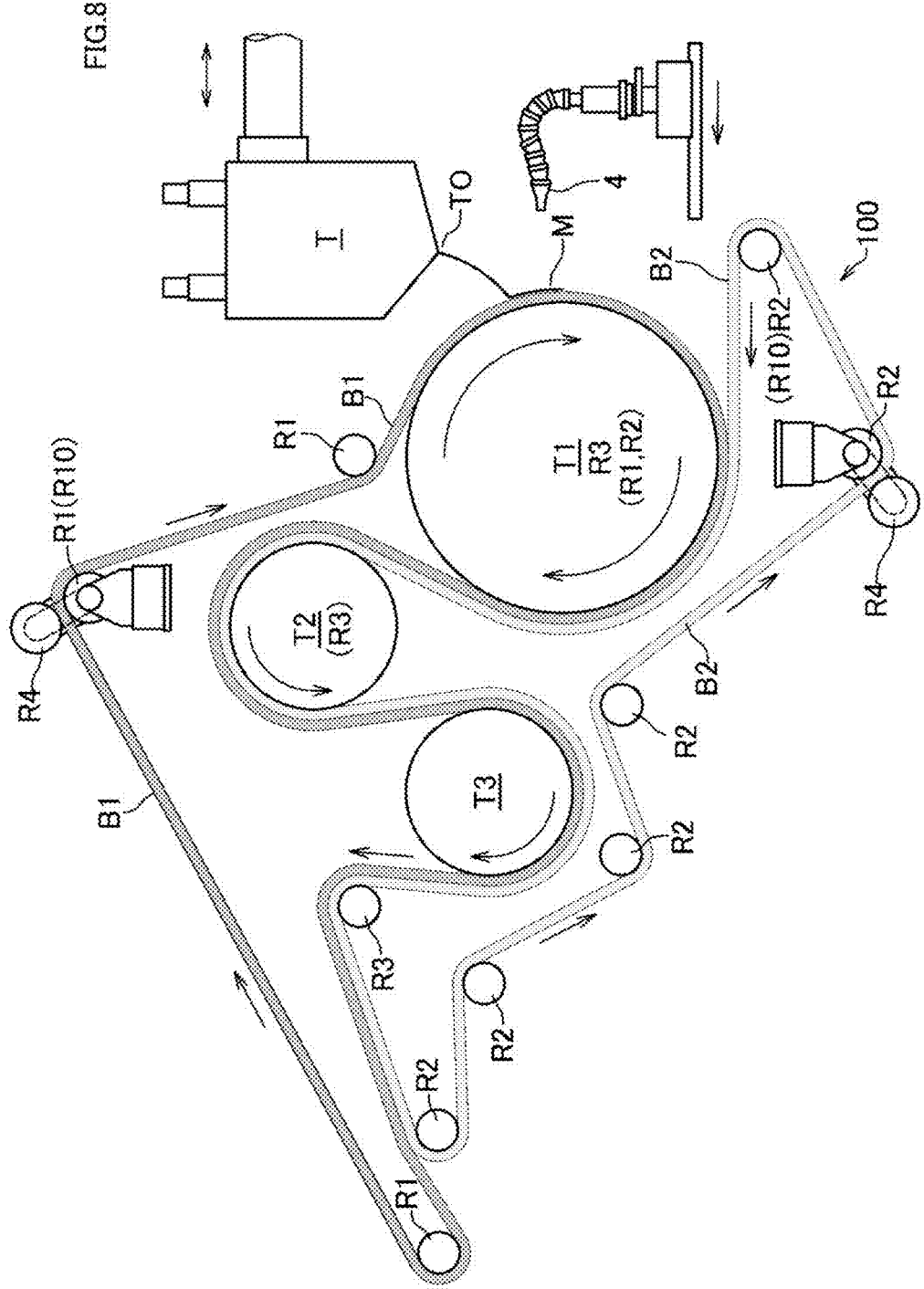

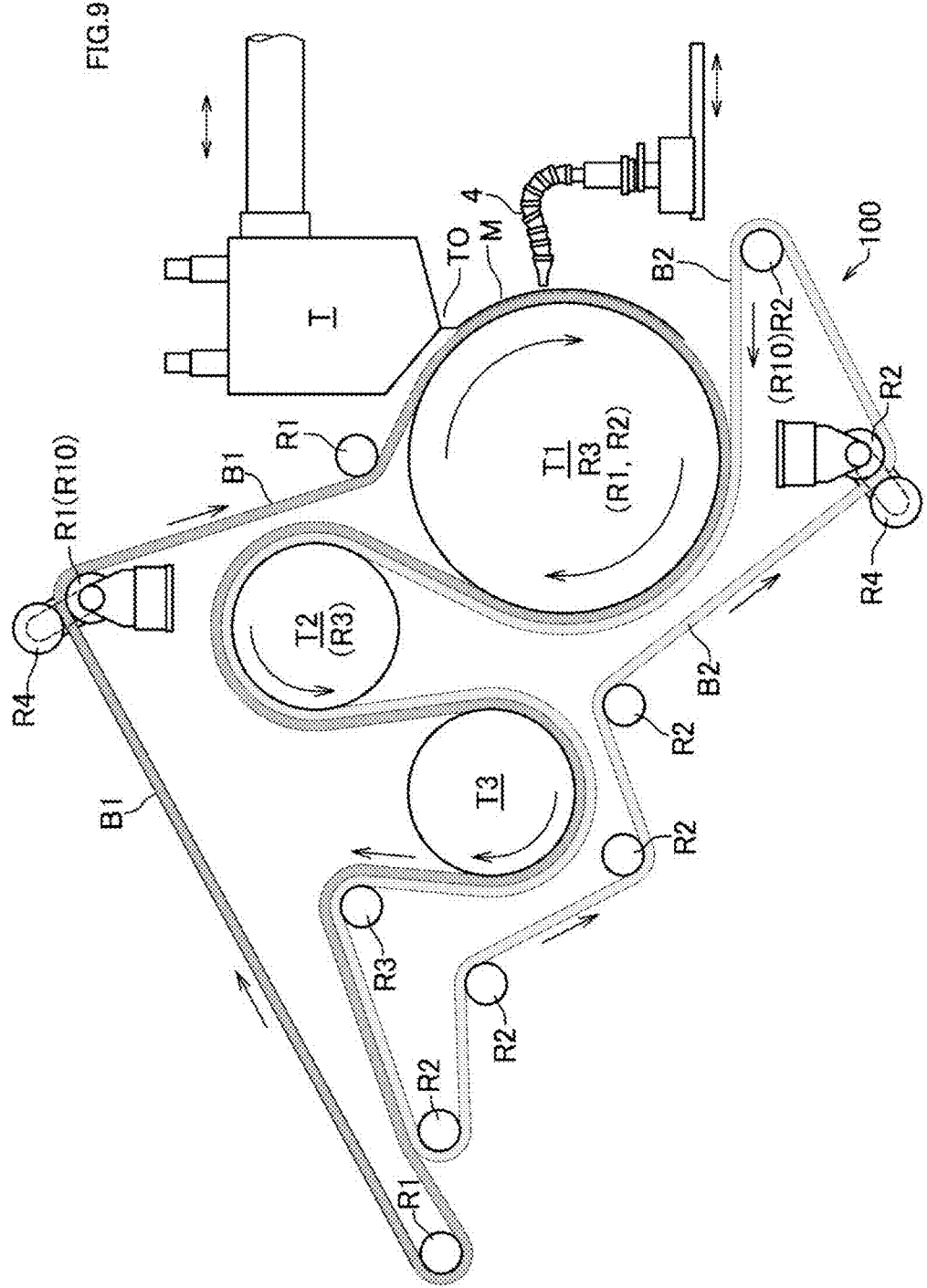

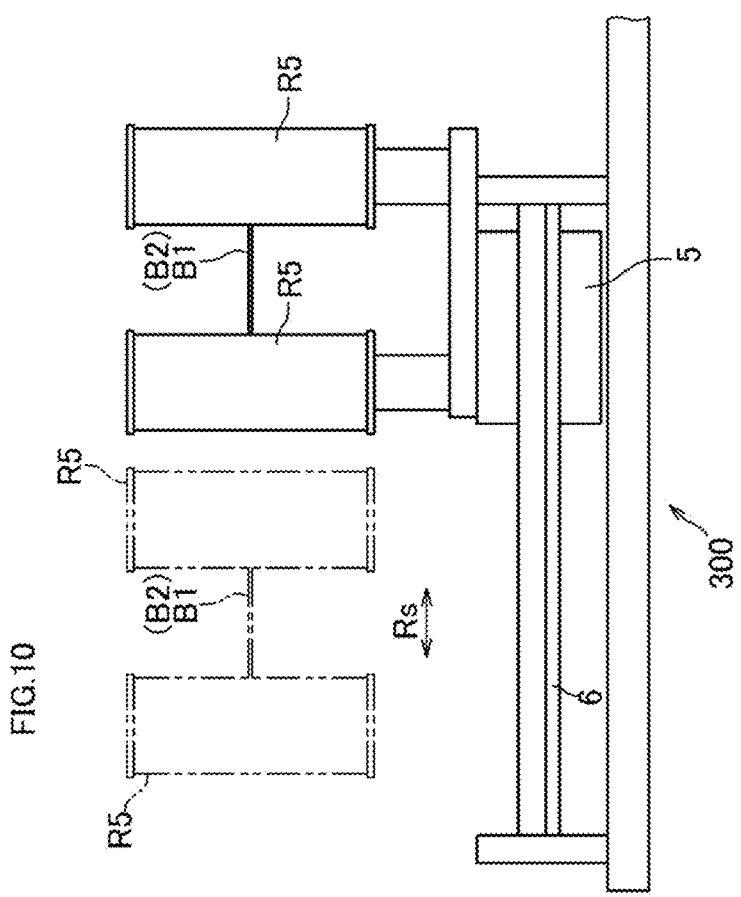

PRODUCTION METHOD AND PRODUCTION APPARATUS FOR THERMOPLASTIC FILM

TECHNICAL FIELD

The present invention relates to a production method and a production apparatus for thermoplastic film usable in a part of a disposable absorbent article such as a disposable diaper, for example.

BACKGROUND ART

In recent years, a structure in which an elastomer film is sandwiched between a pair of nonwoven fabric sheets has been proposed as a laminate for an absorbent article. Further, it has been proposed to produce the film from resin in a molten state in a production line for this laminate (see patent literature 1)

CITATION LIST

Patent Literature

Patent Literature 1: JP H10-29259A (FIGS. 4 and 5)

SUMMARY OF INVENTION

In the above conventional technique, the resin in the molten state is extruded into a film from a discharge port, the elastomer film is produced by cooling a pre-elastomer having adhesiveness in the form of the extruded film and, thereafter, the elastomer film is laminated on the nonwoven fabric sheet.

In such a production line, when the production of laminates is temporarily stopped and, thereafter, the production is resumed, a pass line for the elastomer film needs to be formed by forming a pass line for the adhesive pre-elastomer. However, conventionally, an operator has formed the pass line for the pre-elastomer by pulling a tip part of the adhesive pre-elastomer. Such an operation is difficult since the pre-elastomer is not completely solidified in some cases.

For example, when the elastomer film is produced and used as an elastic member in a production line for absorbent articles, the line is often stopped due to a change in the size of the products to be produced and the like, and the operation as described above is often performed.

The present invention aims to provide a production method and apparatus for thermoplastic film capable of easily forming a film pass line even if a production line for thermoplastic film is stopped.

A manufacturing apparatus of the present invention is a production apparatus for a thermoplastic film F, including:
a discharger for discharging a thermoplastic molten resin in the form of a film from a discharge port TO, the molten resin becoming the thermoplastic film F;
an endless first belt B1 and an endless second belt B2;
a group of first rolls R1, the first belt B1 being wound on the first rolls R1; and
a group of second rolls R2, the second belt B2 being wound on the second rolls R2;
wherein:
the groups of the first rolls R1 and the second rolls R2 include a plurality of common rolls R3, both of the first and second belts B1, B2 being wound on the common rolls R3;
a pass line 3 for conveying the thermoplastic film F is formed in (between) parts of both the first and second belts B1, B2, the parts being where the first and second belts are wound on the common rolls R3 and in contact with each other via the thermoplastic film F;
the discharge port TO of the discharger T is so provided that the molten resin reaches one first roll R1 of the group of first rolls R1, on a side further upstream than the pass line 3; and
the common rolls R3 include a cooling roll for cooling and solidifying the molten resin discharged from the discharge port TO and having reached the one first roll R1.

On the other hand, a production method of the present invention is a production method for a thermoplastic film F using:
a discharger T for discharging a thermoplastic molten resin in the form of a film from a discharge port TO, the molten resin becoming the thermoplastic film F;
an endless first belt B1 and an endless second belt B2;
a group of first rolls R1, the first belt B1 being wound on the first rolls R1;
a group of second rolls R2, the second belt B2 being wound on the second rolls R2; and
a plurality of common rolls R3 included in the groups of the first and second rolls R1, R2, both of the first and second belts B1, B2 being wound on the common rolls R3,
the production method including:
a step of discharging the molten resin from the discharge port TO of the discharger T such that the molten resin in the film form reaches one first roll R1 of the group of the first rolls R1;
a step of obtaining the thermoplastic film F by cooling and solidifying the molten resin having reached the one first roll R1 with a cooling roll; and
a step of conveying the thermoplastic film F along a pass line 3 formed in (between) parts of both the first and second belts, the parts being where the first and second belts B1, B2 are wound on the common rolls R3 and in contact with each other via the thermoplastic film F.

In the present invention, the film-like (film-form) molten resin discharged and hanging down from the discharge port is conveyed along the pass line after reaching the first belt on the first roll and being cooled by the cooling roll. Here, since the film is conveyed in the pass line while being sandwiched by the first and second belts, an operator need not pull a tip part of the adhesive molten resin and the film can be automatically introduced into the pass line.

In the present invention, the thermoplastic film F may be an elastomer film F.

In the present invention, the thermoplastic film may be a plastomer film having low stretchability. If the thermoplastic film is an elastomer film, the elastomer film may be such a film having high stretchability that the length is expanded by two to several folds and is restored to an initial length.

In the present invention, the molten resin means resin discharged in the form of a film from a discharge port of a T die or the like at a temperature equal to or higher than a softening point of thermoplastic resin (e.g. thermoplastic elastomer).

The thermoplastic elastomer is a polymer material which is softened by heating and deformed by an external force, but exhibits rubber elasticity at a room temperature. For example, a polyethylene copolymer can be employed as the thermoplastic elastomer (see JP H10-29259A).

BRIEF DESCRIPTION OF THE DRAWINGS

FIG. 6A is a sectional view showing an example of sliding mechanisms for belts, FIG. 6B is a conceptual diagram showing the relationship of belts, the film and a common roll, and FIGS. 6C and 6D are sectional views respectively showing the relationship of the belts and the film, FIG. 8 is a schematic layout diagram showing another example of the production apparatus, FIG. 9 is, similarly, a schematic layout diagram, and FIG. 10 is a sectional view showing another example of the sliding mechanism for belts.

In FIGS. 1 to 5 and 7 to 9, first and second belts are shown by gray thick lines having mutually different densities and nonwoven fabric sheets are shown by gray thin lines.

DESCRIPTION OF EMBODIMENTS

Figure 1:
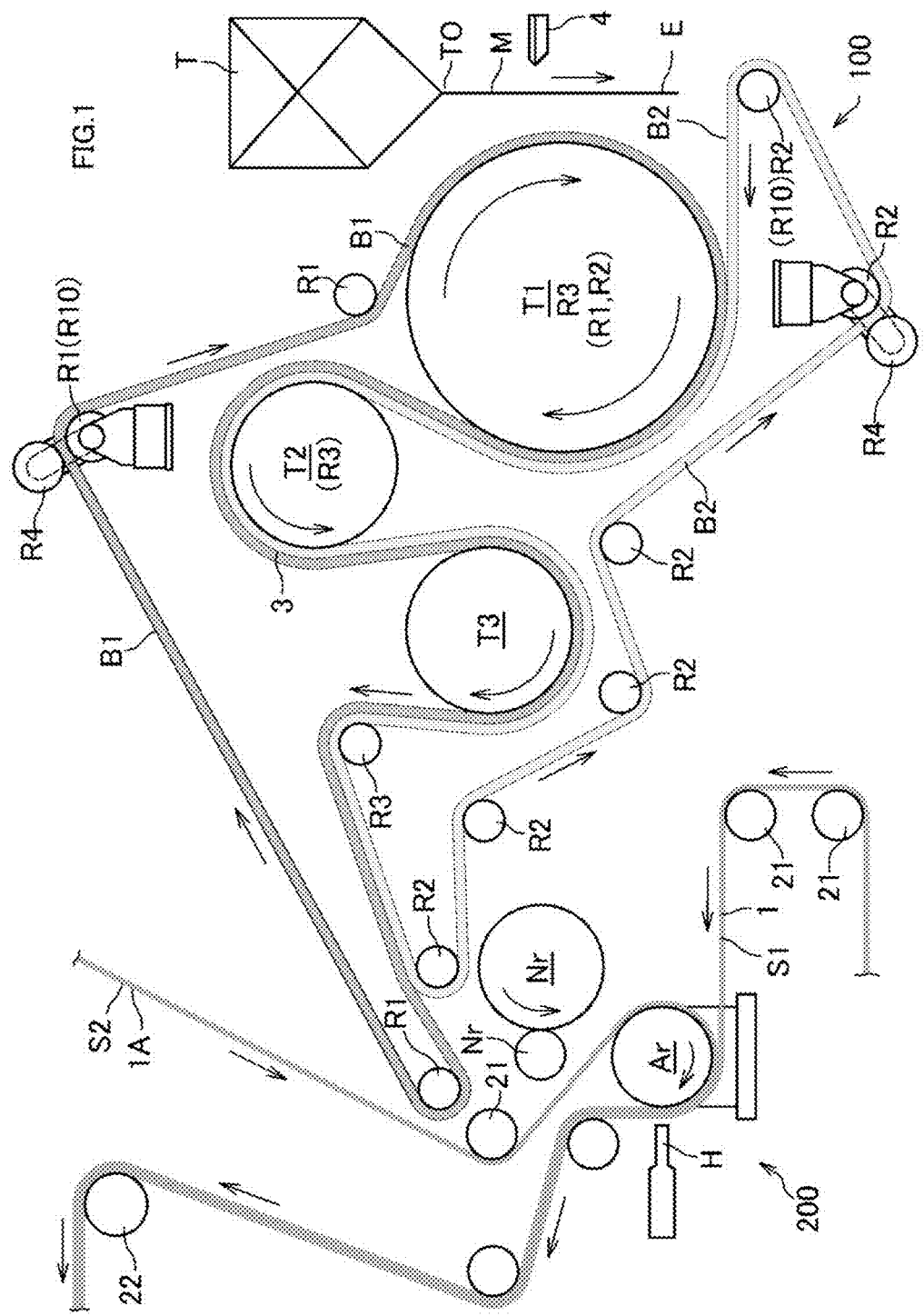
FIG. 1 is a schematic layout diagram showing one embodiment of a production apparatus of the present invention in a process of causing molten resin to hang down from a discharge port.

Preferably, the one first roll R1 is the cooling roll.

In this case, the molten resin having reached the one first roll immediately starts to be cooled.

Preferably, the first belt B1 is wound on the one first roll R1 on a side further upstream than a part of the one first roll R1 reached by the molten resin.

In this case, the film-like molten resin can be supplied to the first roll while being spread over the first roll and the first belt.

Preferably, a width D of the first and second belts B1, B2 is smaller than a length L in an axial direction Rs of the cooling roll, and the first and second belts B1, B2 are provided movably in the axial direction Rs between a first position P1 where the film F is sandwiched and conveyed and a second position P2 where the film is not sandwiched.

In this case, if the both belts are moved to the second positions P2 after the tip of the film passes through the pass line and the conveyance of the film is stabilized, the film can be conveyed without being sandwiched by the both belts.

Preferably, pressing means is provided which presses the film-like molten resin against the one first roll R1 so that the film-like molten resin reaches the one first roll R1.

In this case, the molten resin can be conveyed by one first roll before being introduced to between the first and second belts.

Preferably, the pressing means is a blower 4 for blowing a fluid toward a surface of the first roll R1.

In this case, the molten resin can be pushed and expanded over a wide area on the surface of the first roll.

Preferably, another common roll R3 is further provided on which the first and second belts B1, B2 are selectively wound.

In this case, the number of the cooling rolls can be increased and decreased.

Preferably, a joining part (a joining area, a converging point) is further provided which joins and laminates the film F on a sheet S1 on a side downstream of the pass line 3.

In this case, a laminate in which the film and the sheet are laminated can be formed.

Preferably, the film-like molten resin is conveyed and introduced toward the pass line 3 after reaching the first belt B1 and the first roll R1 while being spread in the axial direction Rs of the first roll over both the first belt B1 and the first roll R1.

Further preferably, the film F is conveyed in the pass line 3 while being spread in the axial direction Rs over both the first belt B1 and the common rolls R3.

In these cases, the film can be conveyed by the first and second belts until the film passes through the pass line, and a film pass line can be easily formed. On the other hand, after a state of the film is stabilized, the film can be conveyed along a pass line formed by the common rolls by removing both the belts.

Any feature illustrated and/or depicted in conjunction with one of the aforementioned aspects or the following embodiments may be used in the same or similar form in one or more of the other aspects or other embodiments, and/or may be used in combination with, or in place of, any feature of the other aspects or embodiments.

Embodiment

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

Hereinafter, one embodiment of the present invention is described on the basis of FIGS. 1 to 7. First, a production apparatus 100 is described. The film production apparatus of FIG. 7 constitutes a part of a manufacturing apparatus 200 for a laminate W in which a film F is sandwiched between a first sheet S1 and a second sheet S2 made of nonwoven fabric.

A thermoplastic film produced in this embodiment is, for example, an elastomer film F. This elastomer film F is produced by cooling and solidifying resin in a molten state discharged from a discharge port TO of a discharger T while the resin is passing in a film pass line 3 in a state of pre-elastomer M. Here, the pre-elastomer M means a membrane-like (film-like) thermoplastic elastomer having properties close to those of a non-elastic liquid immediately after coming out in a molten state from a discharge port.

Figure 5:
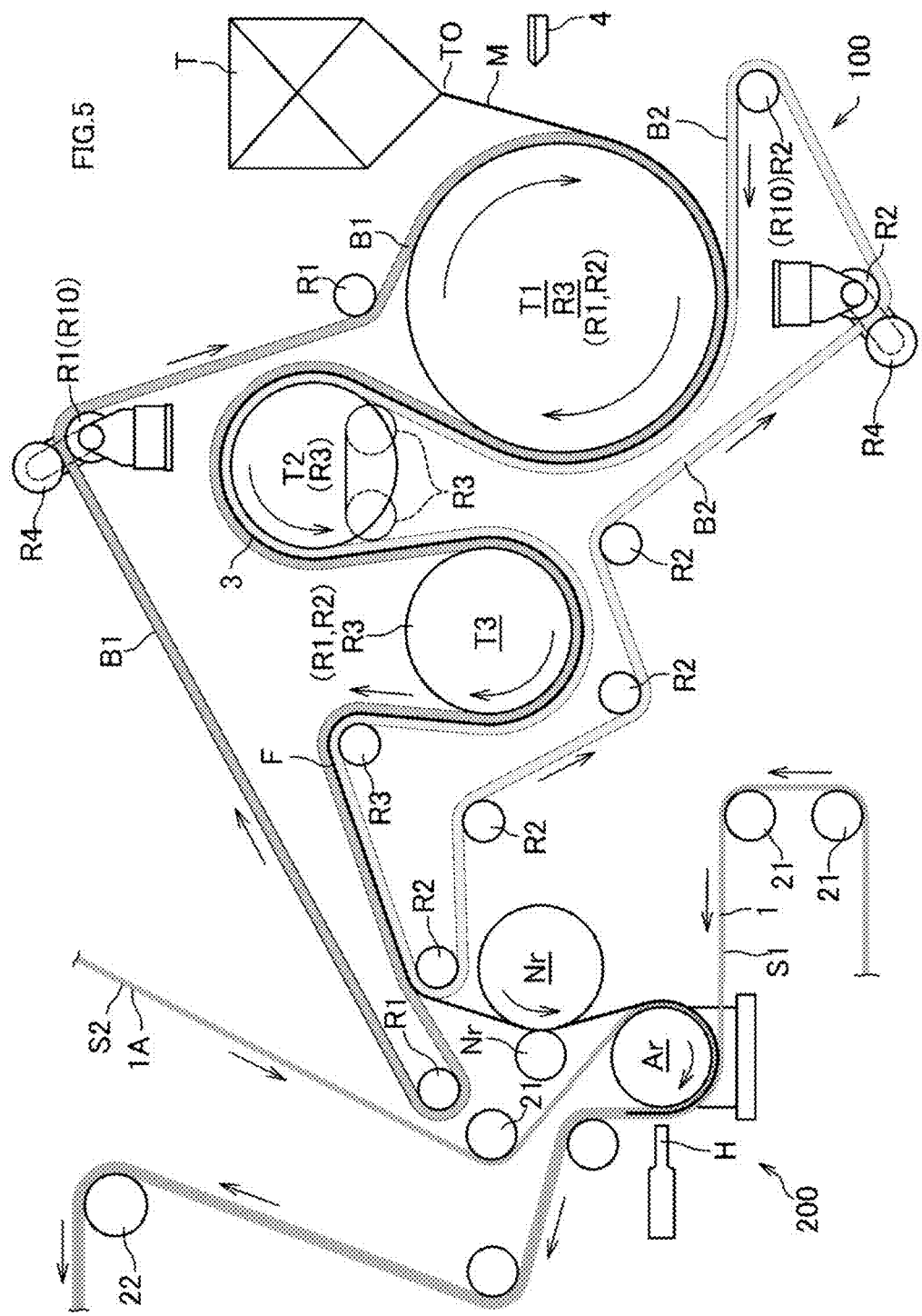
FIG. 5 is a schematic layout diagram showing a state where the film is sandwiched between a pair of sheets to join the sheets.
Figure 7:
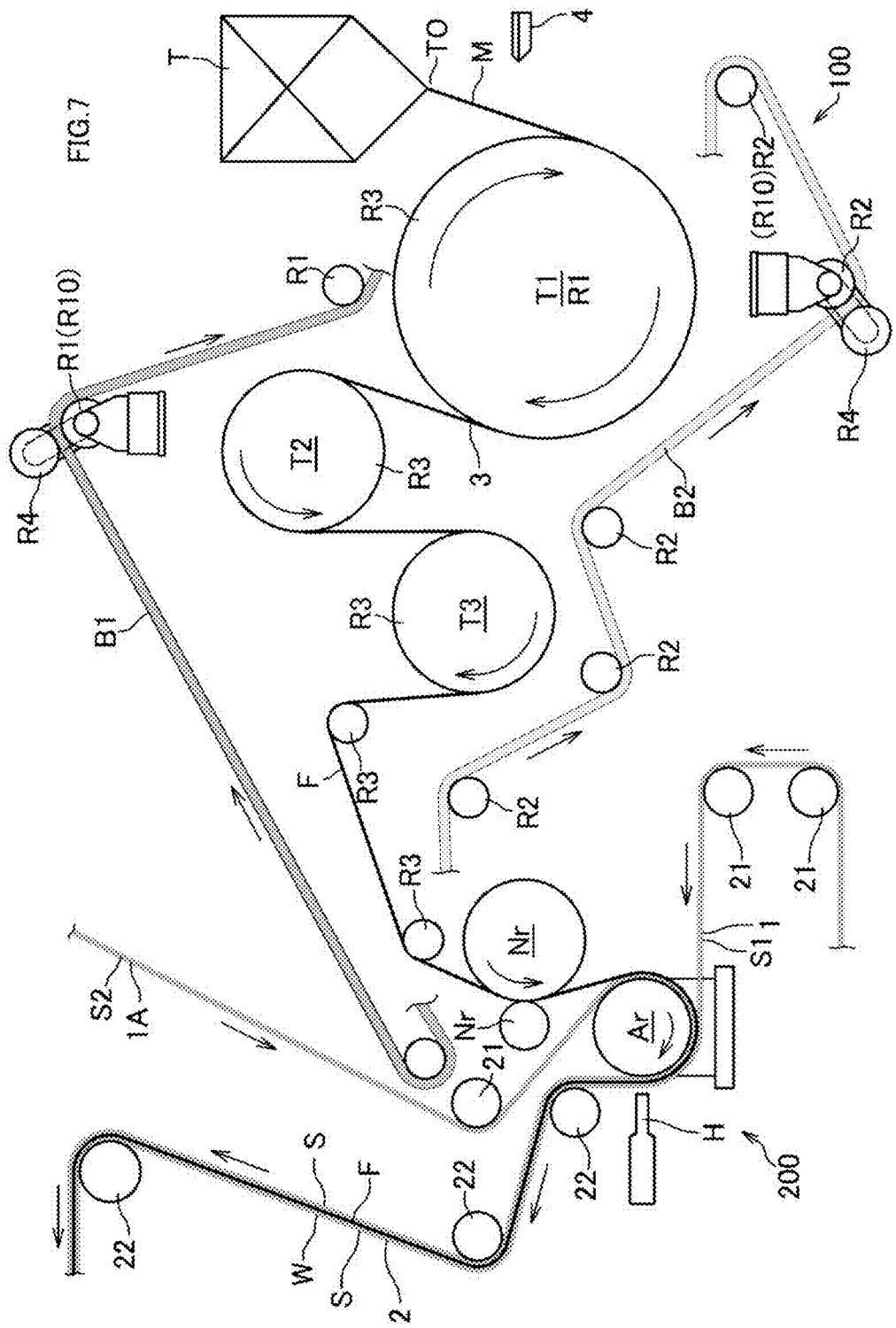
FIG. 7 is a schematic layout diagram showing a state where a pair of the belts are moved from the pass line.

In FIG. 5, first and second belts B1, B2 are wound on common rolls R3 and convey the film M, F in parts of the both belts B1, B2 in contact with each other across the film M, F. As shown in FIG. 7, the film M, F in the film pass line 3 is directly wound on the common rolls R3 during a steady operation.

In FIG. 5, the discharger T causes the resin in the molten state, which becomes the pre-elastomer M, to hang down from the discharge port TO and continuously discharges the film-like pre-elastomer M. A blower (pressing means) 4 may be provided obliquely downward of the discharger T.

In FIG. 5, the blower 4 presses the film-like molten resin against a first roll R1 so that the film-like molten resin reaches the first roll R1 in a spread state by blowing a fluid toward a surface of the first roll R1.

In FIG. 5, the first and second belts B1, B2 are endless and are respectively wound on a group of the first rolls R1 and a group of second rolls R2. The groups of the first rolls R1 and the second rolls R2 include a plurality of the common rolls R3 on which both the first and second belts B1, B2 are wound. Note that the first and second belts B1, B2 may be rotationally driven via any one drive roll out of the respective rolls R1 to R3, and the other rolls R1 to R3 flay be driven to rotate by this rotational drive.

In FIG. 5, the common rolls R3 include cooling rolls T1 to T3, and the cooling rolls cool and solidify the molten resin discharged from the discharge port TO having reached the first roll R1 (first cooling roll T1). For example, the first to third cooling rolls T1 to T3 may be provided as the cooling rolls.
Note that each cooling roll is for cooling the molten resin or film and may internally include a flow passage for cooling a roll surface by the flow of a refrigerant.

In FIG. 5, the discharge port TO of the discharger T may be so provided that the molten resin reaches the most upstream cooling roll T1 out of the group of the first rolls R1, on a side further upstream of the pass line 3. The first belt B1 is wound on the first cooling roll T1 on a side further upstream than a part of the first cooling roll T1 reached by the molten resin.

As shown in FIG. 6B, a pair of the first belts B1 and a pair of the second belts B2 are respectively provided. A width D of the first and second belts B1, B2 is smaller than a length L in an axial direction Rs of each of the cooling rolls T1 to T3. The first and second belts B1, B2 are provided movably in the axial direction Rs of FIG. 6A between a first position P1 of FIG. 6B where the film F is conveyed with both side edges thereof sandwiched and a second position P2 of FIG. 6C or 6D where the film is not sandwiched.

FIG. 6A shows an example of sliding mechanisms 300 for the respective belts B1, B2.
A pair of the first rolls R1, R1 (and the second rolls R2, R2) shown in FIG. 6A are provided while being spaced apart in the axial direction Rs and both constitute moving rolls R10 slidable in the axial direction Rs.

A clamp roll R4 is pressed against each moving roll R10 of FIG. 6A via the belt B1 or B2. The clamp roll R4 and the moving roll R10 are provided movably in the axial direction Rs along a guide rail 6 via a slider 5.

The slider 5 of FIG. 6A is coupled to a drive source such as an air cylinder and reciprocally moves between positions corresponding to the first position P1 or the second position P2 of FIG. 6B as the air cylinder expands and contracts. Note that, at the second position P2, the first and second belts B1 B2 may move to positions where the first and second belts B1, B2 are not facing each other as shown in FIG. 6D.

FIG. 7 shows a state where each belt B1, B2 is retracted from the film pass line 3. During the steady operation shown in FIG. 7, the pre-elastomer M and the elastomer film F are in contact with the surfaces of the common rolls R3, but are not in contact with each belt B1, B2 in the film pass line 3.

Next, a steady production method is described.

FIG. 7 shows a steady operation for continuously producing the laminate W. In FIG. 7, the discharger T is a known extrusion molding machine called a T-die, and a thermoplastic elastomer (resin) in a molten state is temporarily stored in the T die. The T die continuously produces the pre-elastomer M by discharging the resin in the molten state, which becomes the pre-elastomer M, in the form of a film from the discharge port TO thereof.

The pre-elastomer M discharged from the discharge port TO of FIG. 7 is temporarily cooled by being wound on the outer peripheral surface of the first cooling roll T1, and conveyed toward the outer peripheral surfaces of the second and third cooling rolls T2, T3 on a downstream side. In this way, the pre-elastomer M is substantially solidified and has elasticity (stretchability) as the elastomer film (an example of the thermoplastic film) F.

The pre-elastomer M which moved toward the second and third cooling rolls T2, T3 of FIG. 7 is secondarily cooled by the outer peripheral surfaces of the second and third cooling rolls T2, T3. In this way, the pre-elastomer M is completely solidified to become the elastomer film (elastic film) F.

In FIG. 7, the secondarily cooled elastomer film F moves toward a bonding roll Ar after being sandwiched between nip rolls Nr on a further downstream side. The bonding roll Ar has a larger circumferential speed (conveying speed) than the nip rolls Nr. Thus, the elastomer film F is stretched in a conveying direction between the nip rolls Nr and the bonding roll Ar.

Specifically, the nip rolls Nr of FIG. sandwich the elastomer film F on a side further upstream than the bonding roll Ar. After the elastomer film F passes through the film pass line 3, the elastomer film F before being bonded to the both sheets S1, S2 is stretched in the conveying direction because a conveying speed V of the elastomer film F on the bonding roll Ar is larger than a conveying speed Vs of the elastomer film F on the nip rolls Nr. In this way, a pre-stress (tension) is applied to the elastomer film F.

As just described, the molten resin becomes the elastomer film (thermoplastic film) F by way of a state of the pre-elastomer (film raw material) M. Here, at which points of time a transition from the molten resin as a substance to the pre-elastomer M and a transition from the pre-elastomer M to the elastomer film F are exhibited differ depending on a glass-transition temperature, a thickness of the resin and a room temperature, and are not certain.

For example, the molten resin becomes the pre-elastomer M and looks like a solid substance at a glance immediately after coming out from the discharge port TO, but may have properties close to those of a non-elastic liquid.

On the other hand, the pre-elastomer M changes to the elastomer film F a part pulled on a side downstream of the nip rolls Nr, but this timing differs when the pre-elastomer M becomes the elastomer film F after contacting the second cooling roll T2 upstream of the nip rolls Nr, when the pre-elastomer M becomes the elastomer film F after contacting the first cooling roll T1, and the like.

Accordingly, the film pass line 3 means a conveyance path for the film in a state where the film is at least partially the pre-elastomer (film raw material) M.

On the other hand, the first and second sheets S1, S2 made of nonwoven fabric are supplied to the bonding roll Ar of FIG. 7. Each of the sheets S1, S2 is supplied to the bonding roll Ar along a first or second sheet pass line 1, 1A.

The elastomer film F of FIG. 7 is introduced to the bonding roll Ar while being sandwiched by the first and second sheets S1, S2, and the pair of sheets S1 and S2 and the elastomer film F are bonded to and laminated with each other on the bonding roll Ar by an ultrasonic horn H to produce the laminate W.

Specifically, after the elastomer film F of FIG. 7 passes through the film pass line 3, the horn H repeatedly applies ultrasonic vibration to the bonding roll Ar to bond the elastomer film F to the first and second sheets S1, S2 on the bonding roll Ar, whereby the laminate W is produced. In this way, both the sheets S1, S2 and the elastomer film F are conveyed in an overlapping manner along the outer peripheral surface of the bonding roll Ar and the horn H applies ultrasonic vibration to the bonding roll Ar, whereby ultrasonic energy is applied to both the sheets S1, S2 and the elastomer film F and the film F is bonded to and laminated with both the sheets S1, S2.

Note that the laminate W may be produced not by ultrasonic bonding by the horn H, but by heat welding by a heating roll.

Further, the bonding may be, for example, intermittently performed so that the laminate W alternately has stretch regions and bonded regions.

Although the laminate W of FIG. 7 is continuously produced, the production may be temporarily stopped due to a size change or the like. In this case, the film pass line 3 shown in FIGS. 1 to 5 is formed for a new elastomer film F.

Next, the manufacturing apparatus 200 for laminate is described.

In FIG. 7, the nip rolls Nr and each cooling roll T1 to T3 are rotationally driven at the circumferential speed Vs by unillustrated motors. On the other hand, the bonding roll Ar is rotationally driven at the circumferential speed V larger than the circumferential speed Vs by an unillustrated motor.

In FIG. 7, the sheet pass lines 1, 1A are formed by one or more rolls 21, the bonding roll Ar, and the like for conveying the sheets S. A pass line 2 for the laminate W is formed by the bonding roll Ar, rolls 22, and the like for conveying the laminate W. The film pass line 3 is formed by the first to third cooling rolls T1 to T3 for conveying the pre-elastomer M or elastomer film F, the common rolls R3, the bonding roll Ar for bonding the elastomer film F to the both sheets S1, S2, and the like. Note that the pass line 2 for the laminate W is formed so that the pair of sheet pass lines 1, 1A and the film pass line 3 join at the bonding roll Ar.

A process of passing a film through the film pass line 3 necessary prior to the production of a new laminate W is described.

In FIG. 1, the first cooling roll T1 is arranged to face one side surface of the pre-elastomer M hanging down from the discharge port TO. Thus, the pre-elastomer M discharged from the discharger T hangs straight down without contacting the first cooling roll T1.

Specifically, the resin in the molten state, which becomes the pre-elastomer M of FIG. 1, hangs down from the discharge port TO of the discharger T, and the film-like pre-elastomer M is continuously discharged. In this way, the pre-elastomer M hangs down on one flat plane along a vertical plane without contacting each roll T1, T2, T3.

Figure 2:
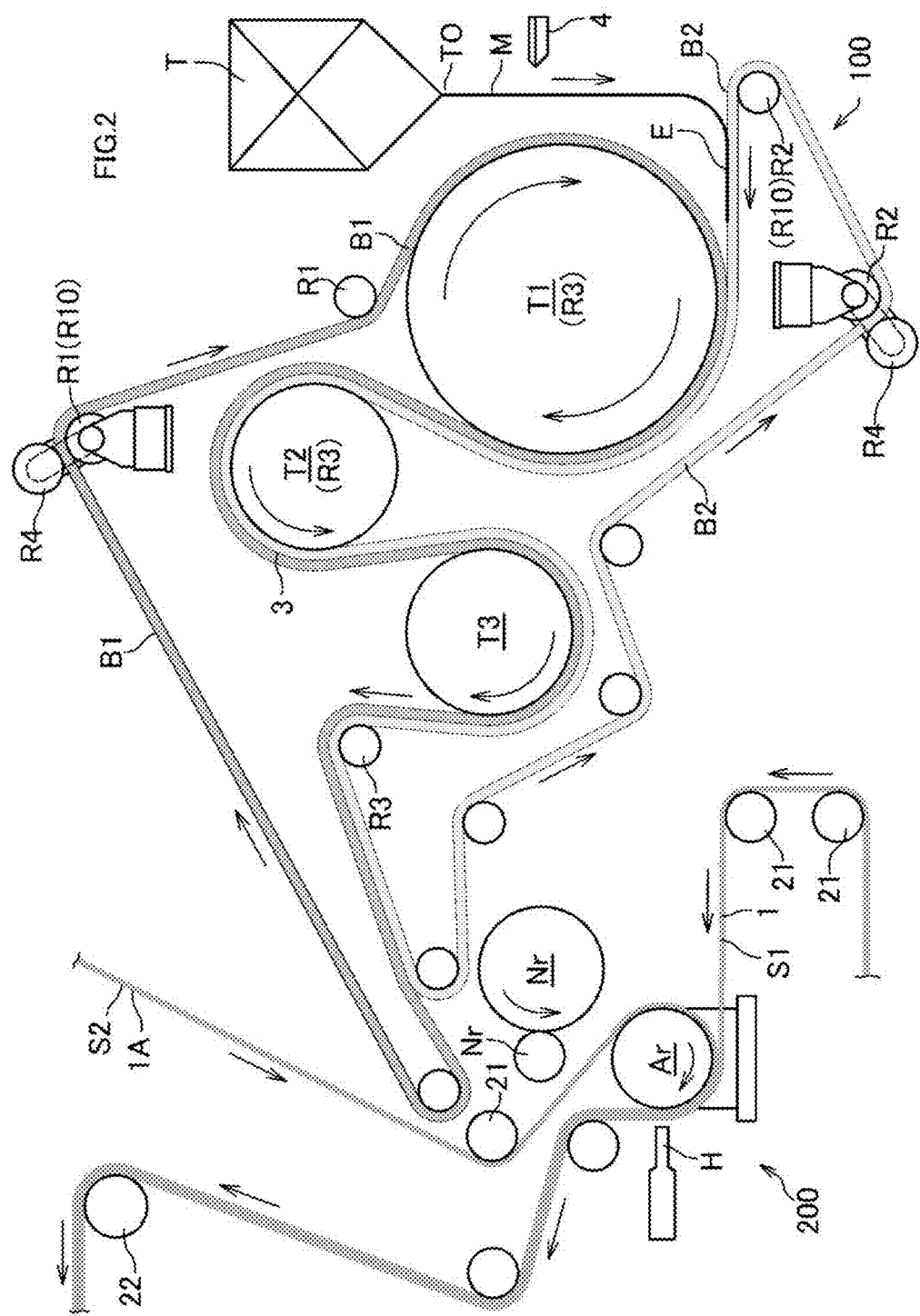
FIG. 2 is a schematic layout diagram showing a state where a tip part of the molten resin hanging down from the discharge port is conveyed by a second belt.

On the other hand, the second belts B2 are conveyed in a lateral or oblique lateral direction immediately below the discharge port TO. In a state where the second belts B2 are conveyed, a tip part E of the pre-elastomer M discharged and hanging down from the discharge port TO is received by the second belts B2 as shown in FIG. 2.

Figure 3:
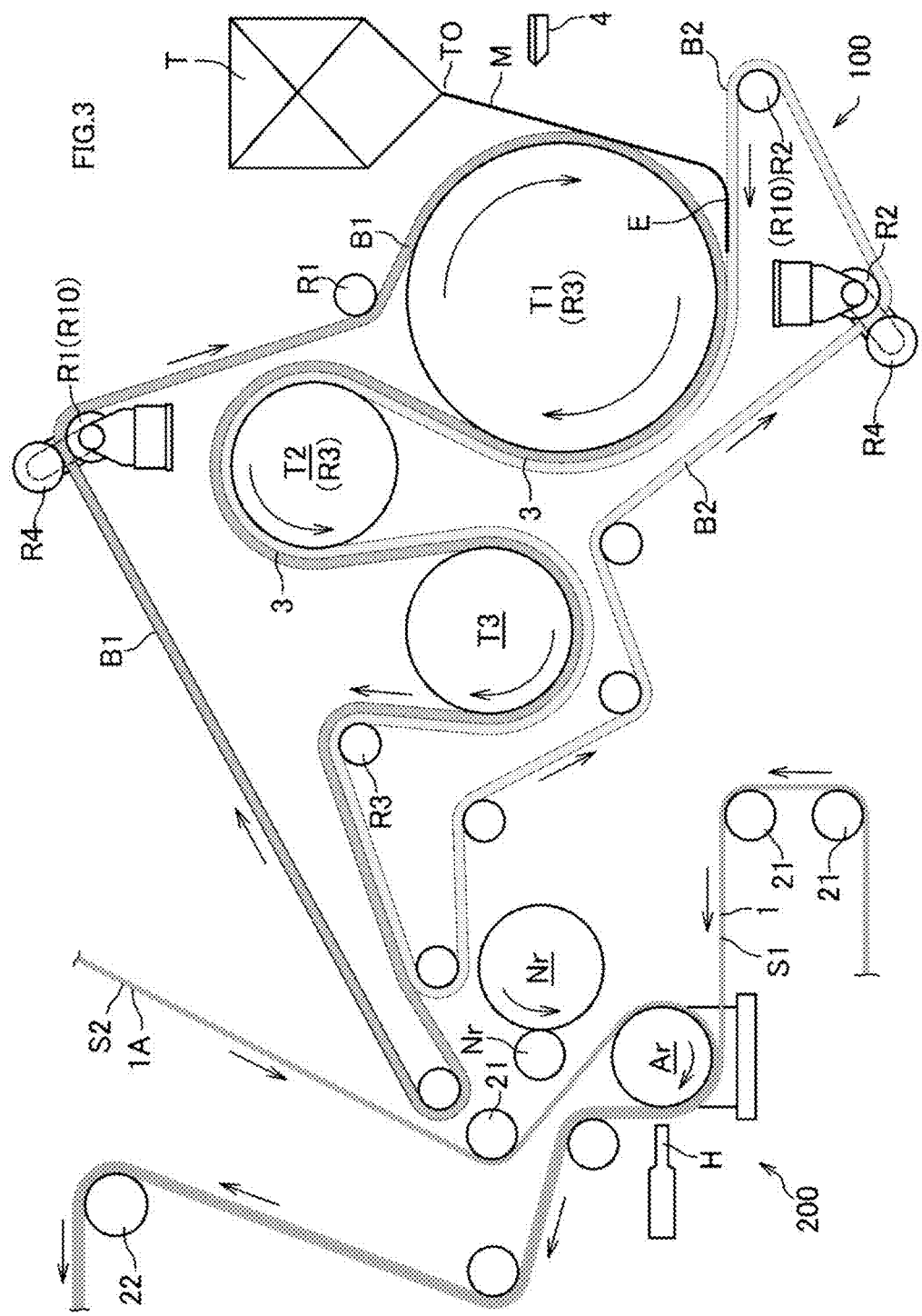
FIG. 3 is a schematic layout diagram showing a state where a film is introduced into a pass line.

After being received, the tip part E overlaps on the second belts B2, and the pre-elastomer M is conveyed toward the film pass line 3 in this overlapping state by the second belts B2 as shown in FIG. 3.

Specifically, the pre-elastomer M of FIG. 3 is introduced to the film pass line 3 and contacts the first cooling roll T1 and the first belts B1. In this way, the molten resin is discharged from the discharge port TO of the discharger T so that the film-like molten resin reaches one first cooling roll T1 out of the group of the first rolls R1, as shown in FIG. 3.

Figure 4:
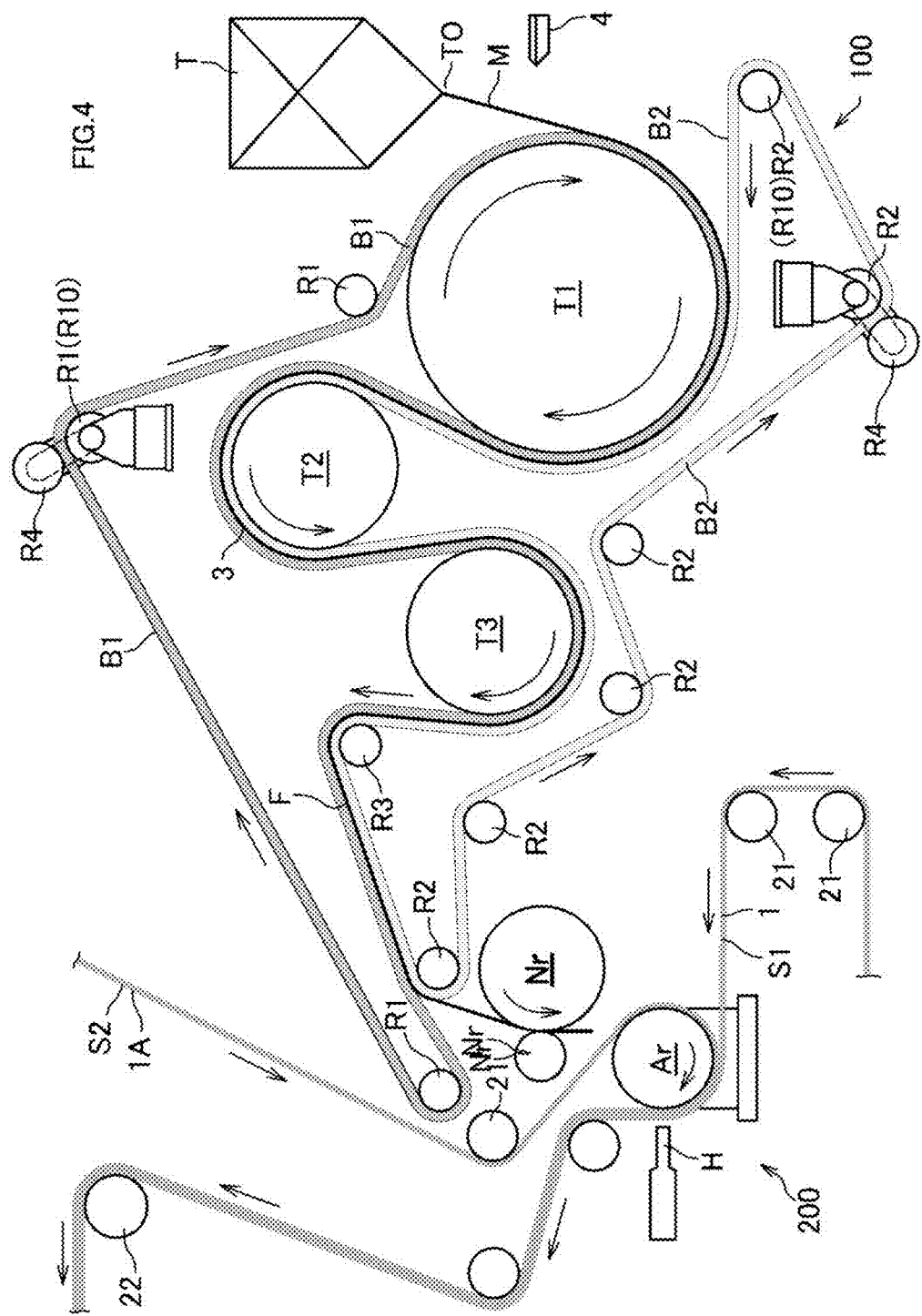
FIG. 4 is a schematic layout diagram showing a state where the film is conveyed in the pass line.

The film pass line 3 of FIG. 4 is formed in parts of both the belts wound on the common roll R3 and in contact with each other across the film F. The pre-elastomer M is conveyed along the film pass line 3. In this pass line 3, the molten resin and the pre-elastomer M having reached the first cooling roll T1 are cooled by each cooling roll T1, T2, T3 to become the solidified elastomer film F.

In these processes, as shown in FIG. 6B, the film-like molten resin is conveyed and introduced toward the pass line 3 (FIG. 5) after reaching the first belts B1 and the first roll R1 while being spread in the axial direction Rs of the first roll R1 over both the first belts B1 and the first roll R1.

Similarly, as shown in FIG. 6B, the film F is conveyed in the pass line 3 while being spread in the axial direction Rs on both the first belts B1 and the common rolls R3.

When the tip part E of the elastomer film F reaches the bonding roll Ar, which is a joining part, as shown in FIG. 5 in this way, the first and second belts B1, B2 are removed from the film pass line 3 as described below and as shown in FIGS. 6C, 6D and 7.

Specifically, both the belts B1, B2 are moved from the first positions P1 where the belts B1, B2 are arranged along both side edges in the width direction of the film F (M) as shown in FIG. 6B to the second positions P2 where the belts B1, B2 are separated from the film F (M) as shown in FIG. 6C or 6D. In this way, both the belts B1, B2 move in the axial direction Rs from the first positions P1 where the film F (M) is sandwiched and conveyed to the second positions P2 where the film F (M) is not sandwiched.

The film F (M) in contact with both the belts B1, B2 and each of the common rolls R3 in FIG. 6 is conveyed in contact with each common roll R3 without contacting both the belts B1, B2 as shown in FIG. 7 by movements of both the belts in the axial direction Rs.

In FIG. 6A, both the belts are moved by the sliders 5 being moved outward in the axial direction Rs along the guide rails 6 and the first rolls R1 (R2) and the clamp rolls R4 being moved outward in the axial direction Rs by the operation of actuators such as motors or air cylinders.

In FIG. 7, if both the belts B1, B2 are retracted from the film pass line 3 by the movements of the both belts, the film F is steadily produced and sandwiched between the pair of sheets S1, S2, and the laminate W is continuously produced as described above.

FIGS. 8 and 9 show another embodiment.

As shown in FIGS. 8 and 9, a discharger T and a blower 4 are movable in a horizontal direction with respect to a first cooling roll T1 in this embodiment.

Specifically, the discharger T moves from a position of FIG. 8 right above second belts B2 to a position of FIG. 9 near the first cooling roll T1. On the other hand, the blower 4 of FIG. 8 moves from a position apart from the first cooling roll T1 to a position of FIG. 9 near the first cooling roll T1.

In this way, a pre-elastomer M hanging down from a discharge port TO of FIG. 8 not only easily reaches the first cooling roll T1 by the action of a fluid from the blower 4, but also is easily cooled before being sandwiched by the both belts B1, B2, by having a large contact area with the first cooling roll T1 as shown in FIG. 9.

FIG. 10 shows another example of the sliding mechanism 300 for retracting each belt B1, B2 from the pass line 3. In the example of FIG. 10, a pair of slide rollers R5, R5 of FIG. 10 are provided instead of or in addition to the clamp rolls R4 of FIG. 6A.

The sliding mechanism 300 of FIG. 10 is provided for each belt B1 (B2). The slide rollers R5, R5 of this sliding mechanism 300 are mounted on the slider configured to slide with respect to the guide rail 6 and are movable in the axial direction Rs of each cooling roll T1 to T3 (FIG. 1), i.e. in the belt width direction Rs.

The pair of slide rollers R5, R5 of FIG. 10 are so arranged on both sides of each belt B1 (B2) that axes thereof are set in a direction orthogonal to a surface (plane) of each belt B1 (B2).

If the pair of slide rollers R5, R5 are moved in the belt width direction Rs, one slide roller R5 pushes a side surface of the belt B1 (B2), whereby the belt B1 (B2) is moved in the belt width direction Rs and removed from the pass line 3 (FIG. 1) as shown by a two-dot chain line.
Note that the belt B1 (B2) is twisted when the slide rollers R5, R5 push the belt (B2), but the belt B1 (B2) returns to an untwisted state as shown by a two-dot chain line when the slide rollers R5, R5 finish pushing the belt B1 (B2).

The pre-elastomer M discharged from the discharge port TO of FIG. 1 varies in quality in an initial stage of production. Thus, the pre-elastomer M in the initial stage of production may be cut, removed and discarded.

Although the preferred embodiments have been described above with reference to the drawings, a person skilled in the art would easily arrive at various changes and modifications within an obvious range through this specification.
For example, only one cooling roll need be provided. Further, the pre-elastomer may be cooled by air without providing any cooling roll.
Therefore, such changes and modifications are interpreted to be within the scope of the present invention determined from claims.

INDUSTRIAL APPLICABILITY

The present invention can be utilized in the production of a thermoplastic film constituting a part of a laminate of a wearable article such as a disposable diaper.

LIST OF REFERENCE SIGNS

1: first sheet pass line, 1A: second sheet pass line
2: laminate pass line, 3: film pass line
4: blower, 5: slider, 6: guide rail
100: production apparatus, 200: manufacturing apparatus, 300: sliding mechanism
B1: first belt, B2: second belt, D: width
F: elastomer film (thermoplastic film), M: pre-elastomer
E: tip part
Ar: bonding roll, H: horn, Nr: nip roll
T: discharger, TO: discharge port
T1: first cooling roll, T2: second cooling roll, T3: third cooling roll
P1: first position, P2: second position.
R1: first roll, R2: second roll, R3: common roll, R4: clamp roll
R5: slide roller, R10: moving roll,
Rs: axial direction, L: length
S1: first sheet, S2: second sheet, W: laminate

The invention claimed is:

1. A production apparatus for a thermoplastic film, comprising:
a discharger for discharging a thermoplastic molten resin in the form of a film from a discharge port, the molten resin becoming the thermoplastic film;
an endless first belt and an endless second belt;
a group of first rolls, the first belt being wound on the first rolls; and
a group of second rolls, the second belt being wound on the second rolls;
wherein:
the groups of the first rolls and the second rolls include a plurality of common rolls, both of the first and second belts being wound on the common rolls;
a pass line for conveying the thermoplastic film is formed in parts of both the first and second belts, the parts being where the first and second belts are wound on the common rolls and in contact with each other via the thermoplastic film;
the discharge port of the discharger is so provided that the molten resin reaches one first roll of the group of first rolls, on a side further upstream than the pass line; and
the common rolls include a cooling roll for cooling and solidifying the molten resin discharged from the discharge port and having reached the one first roll,
the first and second belts are provided movably in an axial direction of the common rolls between a first position and a second position, the first position being where the first and second belts sandwich both edges of the thermoplastic film and convey the thermoplastic film, and the second position being where the first and second belts do not sandwich the thermoplastic film, and
after the first and second belts moved to the second position, the thermoplastic film is conveyed in contact with the common rolls without contacting the first and second belts.

2. The production apparatus according to claim 1, wherein the one first roll is the cooling roll.

3. The production apparatus according to claim 1, wherein the first belt is wound on the one first roll on a side further upstream than a part of the one first roll, the part being reached by the molten resin.

4. The production apparatus according to claim 3, wherein:
a width of each of the first and second belts is smaller than a length in an axial direction of the cooling roll, and.

5. The production apparatus according to claim 1, comprising pressing means for pressing the molten resin in the film form against the one first roll so that the film-form molten resin reaches the one first roll.

6. The production apparatus according to claim 5, wherein the pressing means is a blower for blowing a fluid toward a surface of the one first roll.

7. The production apparatus according to claim 1, further comprising a joining part for joining and laminating the thermoplastic film on a sheet on a side downstream of the pass line.

8. The production apparatus according to claim 1, wherein each of the first and second belts are provided in a pair.

9. The production apparatus according to claim 8, wherein the thermoplastic film is conveyed such that (i) one edge of the edges of the thermoplastic film is sandwiched between one of the pair of the first belts and one of the pair of the second belts and (ii) another edge of the edges of the thermoplastic film is sandwiched between another one of the pair of the first belts and another one of the pair of the second belts.

10. A production method for a thermoplastic film using:
a discharger for discharging a thermoplastic molten resin in the form of a film from a discharge port, the molten resin becoming the thermoplastic film;
an endless first belt and an endless second belt;
a group of first rolls, the first belt being wound on the first rolls;

a group of second rolls, the second belt being wound on the second rolls; and a plurality of common rolls included in the groups of the first and second rolls, both of the first and second belts being wound on the common rolls, the production method comprising:

a step of discharging the molten resin from the discharge port of the discharger so that the molten resin in the film form reaches one first roll of the group of the first rolls;

a step of obtaining the thermoplastic film by cooling and solidifying the molten resin having reached the one first roll with a cooling roll;

a step of conveying the thermoplastic film along a pass line formed in parts of both the first and second belts, the parts being where the first and second belts are wound on the common rolls and in contact with each other via the thermoplastic film; and a step of moving the first and second belts in an axial direction of the common rolls between a first position and a second position, the first position being where the first and second belts sandwich both edges of the thermoplastic film and convey the thermoplastic film, and the second position being where the first and second belts do not sandwich the thermoplastic film, wherein after the first and second belts are moved to the second position in the step of moving, the thermoplastic film is conveyed in contact with the common roll without contacting the first and second belts.

11. The production method according to claim 10, wherein a width of each of the first and second belts is smaller than a length in an axial direction of the one first roll, and the molten resin in the film form is conveyed and introduced toward the pass line after reaching the first belt and the one first roll while being spread in the axial direction of the one first roll past an edge of the first belt onto the one first roll.

12. The production method according to claim 11, wherein the thermoplastic film is conveyed in the pass line while being spread in the axial direction past the edge of the first belt onto the common rolls.

13. The production method according to claim 10, wherein each of the first and second belts are provided in a pair.

14. The production method according to claim 13, wherein the thermoplastic film is conveyed such that (i) one edge of the edges of the thermoplastic film is sandwiched between one of the pair of the first belts and one of the pair of the second belts and (ii) another edge of the edges of the thermoplastic film is sandwiched between another one of the pair of the first belts and another one of the pair of the second belts.

* * * * *